(12) United States Patent
Wu

(10) Patent No.: US 9,593,992 B2
(45) Date of Patent: Mar. 14, 2017

(54) TORQUE DETECTING SYSTEM

(71) Applicant: Mu-Chuan Wu, Tainan (TW)

(72) Inventor: Mu-Chuan Wu, Tainan (TW)

( * ) Notice: Subject to any disclaimer, the term of this patent is extended or adjusted under 35 U.S.C. 154(b) by 0 days.

(21) Appl. No.: 14/754,275

(22) Filed: Jun. 29, 2015

(65) Prior Publication Data
US 2016/0377495 A1    Dec. 29, 2016

(51) Int. Cl.
*G01L 3/02* (2006.01)
*G01L 5/00* (2006.01)
*G01B 21/22* (2006.01)
*G01L 3/10* (2006.01)

(52) U.S. Cl.
CPC .............. *G01L 5/00* (2013.01); *G01B 21/22* (2013.01); *G01L 3/10* (2013.01)

(58) Field of Classification Search
CPC . A63B 21/00069; G01L 3/1457; G01L 3/242; G01L 5/00; G01L 3/10; G01B 21/22
USPC ............................... 73/760, 862.193, 862.08
See application file for complete search history.

(56) References Cited

U.S. PATENT DOCUMENTS

| | | | | |
|---|---|---|---|---|
| 4,898,379 A * | 2/1990 | Shiba | ................. | A63B 21/0051 482/61 |
| 5,027,303 A * | 6/1991 | Witte | ..................... | A61B 5/222 482/8 |
| 2002/0082147 A1 * | 6/2002 | Wu | ......................... | A63B 24/00 482/57 |
| 2006/0079382 A1 * | 4/2006 | Lassanske | .............. | A63B 21/22 482/63 |
| 2013/0285802 A1 * | 10/2013 | Juang | .................... | B60Q 1/2673 340/432 |
| 2014/0166385 A1 * | 6/2014 | Arimune | .................. | B62M 6/45 180/206.3 |
| 2014/0274600 A1 * | 9/2014 | Dalebout | ............. | A63B 21/225 482/115 |

* cited by examiner

*Primary Examiner* — Max Noori
(74) *Attorney, Agent, or Firm* — Ming Chow; Sinorica LLC

(57) ABSTRACT

A torque detecting system is adapted to detect a setting torque of a torque providing apparatus. A torque driving apparatus is mounted on a stationary base to exert a resisting force on the torque providing apparatus. The setting torque of the torque providing apparatus corresponds to the resisting force. The torque detecting system comprises an angle detecting module and an operation device. The angle detecting module is mounted on the torque driving apparatus and outputs a detecting voltage. The operation device obtains a torque value via table-searching based on the detecting voltage. The torque value corresponds to the setting torque of the torque providing apparatus. The torque detecting system performs the torque detection through a non-contact detecting technique, such that detecting accuracy would not be affected after long term use.

6 Claims, 10 Drawing Sheets

TORQUE DETECTING SYSTEM

BACKGROUND OF THE INVENTION

1. Field of the Invention

The present invention relates to a torque detecting system, and more particularly to a torque detecting system that is applied to an exercising equipment, such as an exercise bike, to detect the torque set to the exercising equipment.

2. Description of Related Art

An exercise bike mainly comprises a frame, a flywheel, and an adjusting bar assembly. A user can rotate the adjusting bar assembly to change the torque of the flywheel. In order to let the user know the torque of the flywheel, a torque detecting device can be equipped on the exercise bike. A conventional torque detecting device comprises a controller and a variable resistor. The variable resistor is in connection with the flywheel and the adjusting bar assembly. The controller detects resistance of the variable resistor and determines the torque of the flywheel according to variation of the resistance of the variable resistor. However, the variable resistor is a contact-type adjusting structure. After multiple times of changing the resistance, contact members of the variable resistor are worn and damaged so as to affect the resistance. Therefore, detecting accuracy would be decreased after long term use.

SUMMARY OF THE INVENTION

An objective of the present invention is to provide a torque detecting system to overcome the shortcoming that the conventional variable resister would affect the detecting accuracy after long term use.

The torque detecting system of the present invention is adapted to detect a setting torque of a torque providing apparatus. The torque providing apparatus is driven by a torque driving apparatus mounted on a stationary base. The torque driving apparatus exerts a resisting force on the torque providing apparatus. The setting torque of the torque providing apparatus corresponds to the resisting force. The torque detecting system comprises an angle detecting module and an operation device.

The angle detecting module is mounted on the torque driving apparatus and outputs a detecting voltage that is varied with a movement of the torque driving apparatus relative to the stationary base. The operation device is electrically connected to the angle detecting module to receive the detecting voltage and obtain a torque value via table-searching based on the detecting voltage. The torque value corresponds to the setting torque of the torque providing apparatus.

The torque driving apparatus moved relative to the stationary base can change the setting torque of the torque providing apparatus. Besides, an inclined angle of the angle detecting module is varied with the torque driving apparatus to change the detecting voltage. The operation device then obtains a torque value via table-searching based on the detecting voltage. The torque value corresponds to the setting torque of the torque providing apparatus. Hence, the present invention performs the torque detection through a non-contact detecting technique, such that detecting accuracy would not be affected after long term use. The shortcoming resulting from the conventional variable resistor as disclosed in the prior art would be overcome.

DETAILED DESCRIPTION OF THE PREFERRED EMBODIMENT

Figure 1:
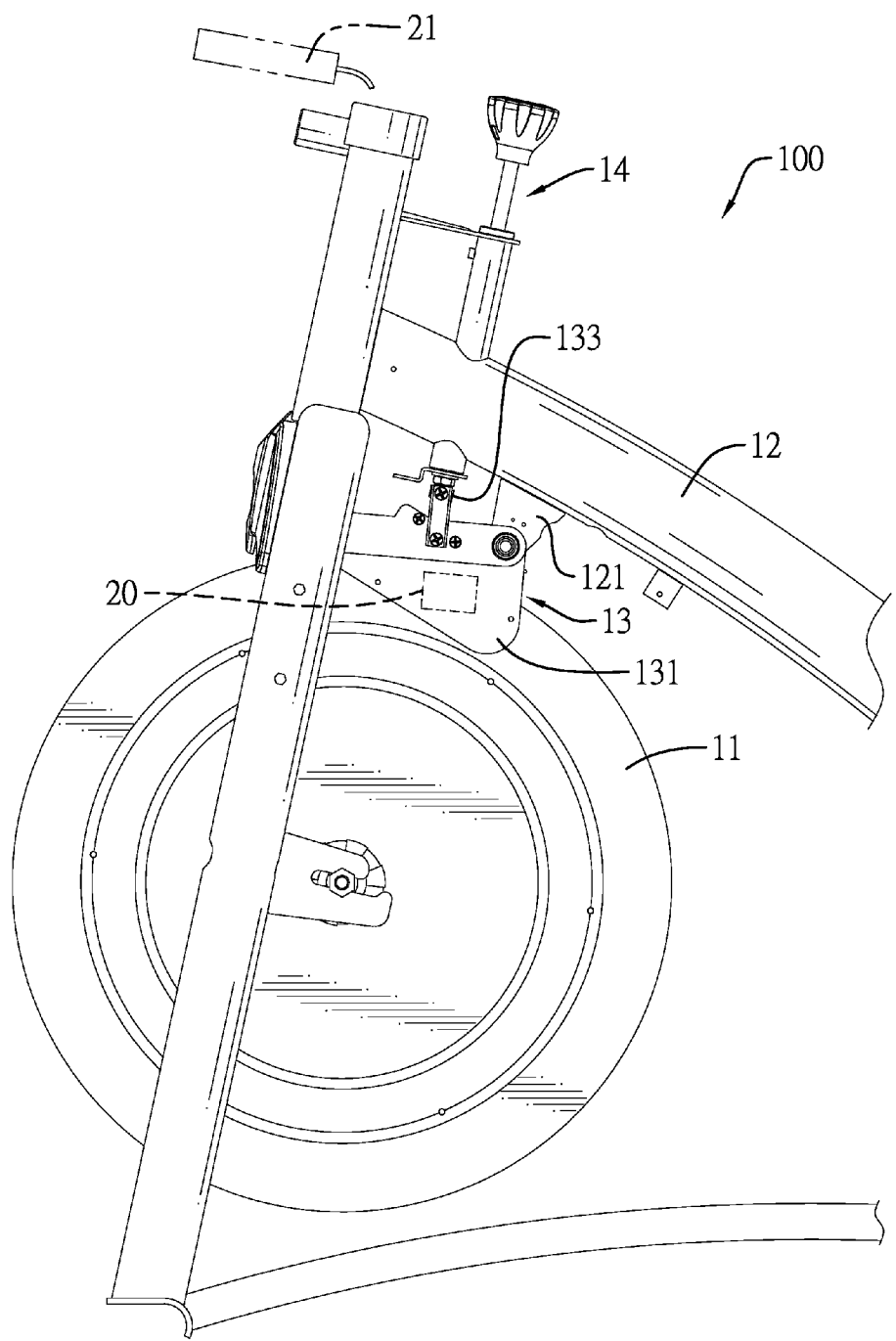
FIG. 1 is a schematic elevation view of a preferred embodiment of the present invention mounted on an exercise bike.

The torque detecting system of the present invention is adapted to detect a setting torque of a torque providing apparatus 11. A torque driving apparatus 13 is mounted on a stationary base 12 to exert a resisting force on the torque providing apparatus 11. The setting torque of the torque providing apparatus 11 corresponds to the resisting force exerted on the torque providing apparatus 11. With reference to FIG. 1, the torque detecting system of the present invention can be applied to, for example but not limited to, an exercise bike 100. The torque providing apparatus 11, the stationary base 12, and the torque driving apparatus 13 are known configuration of the exercise bike 100. The configuration of the exercise bike 100 is briefly introduced below. The torque providing apparatus 11 can be a flywheel of the exercise bike 100. The stationary base 12 can be a bike frame of the exercise bike 100.

Figure 2:
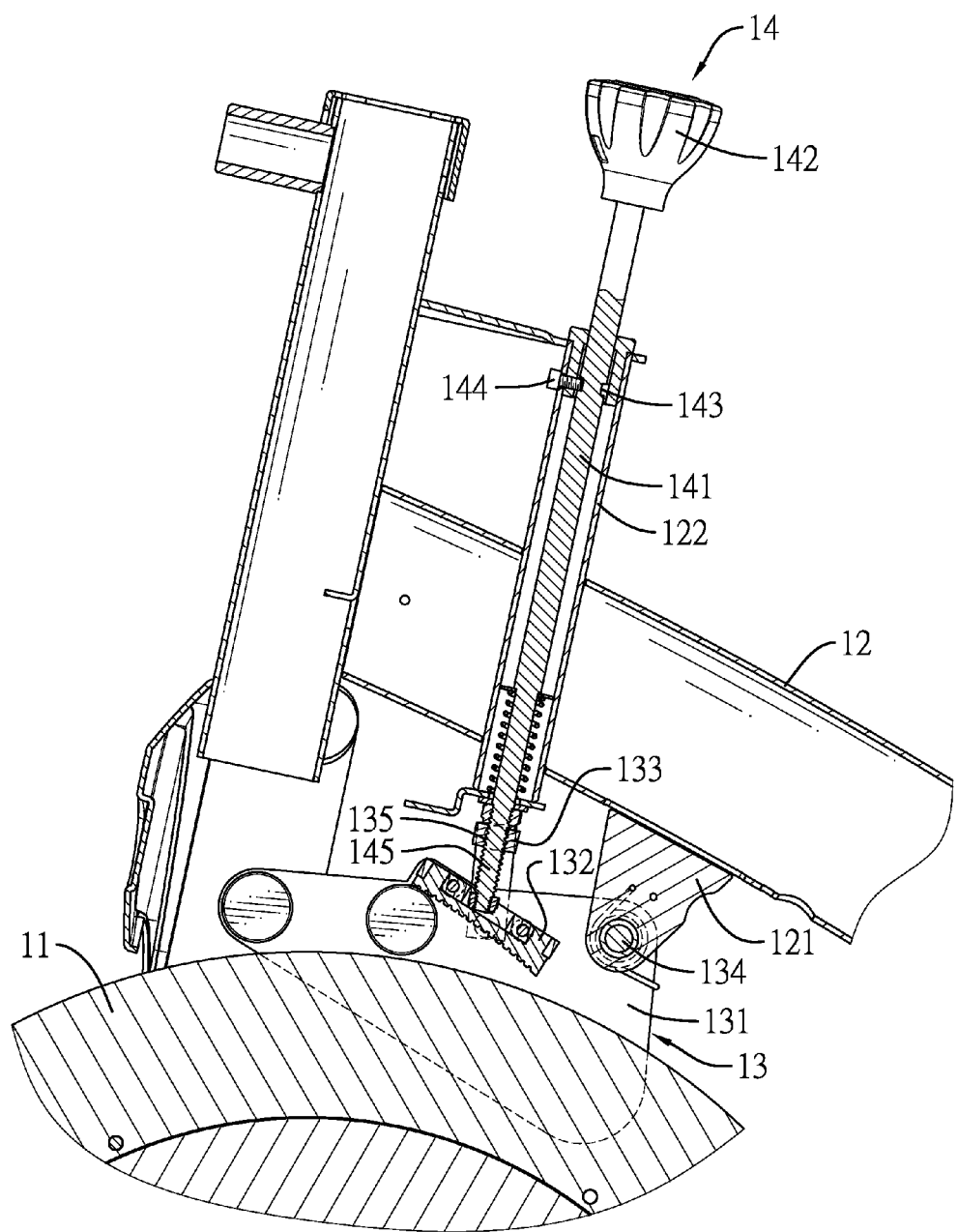
FIG. 2 is a partial cross-sectional view of the exercise bike of FIG. 1.
Figure 3:
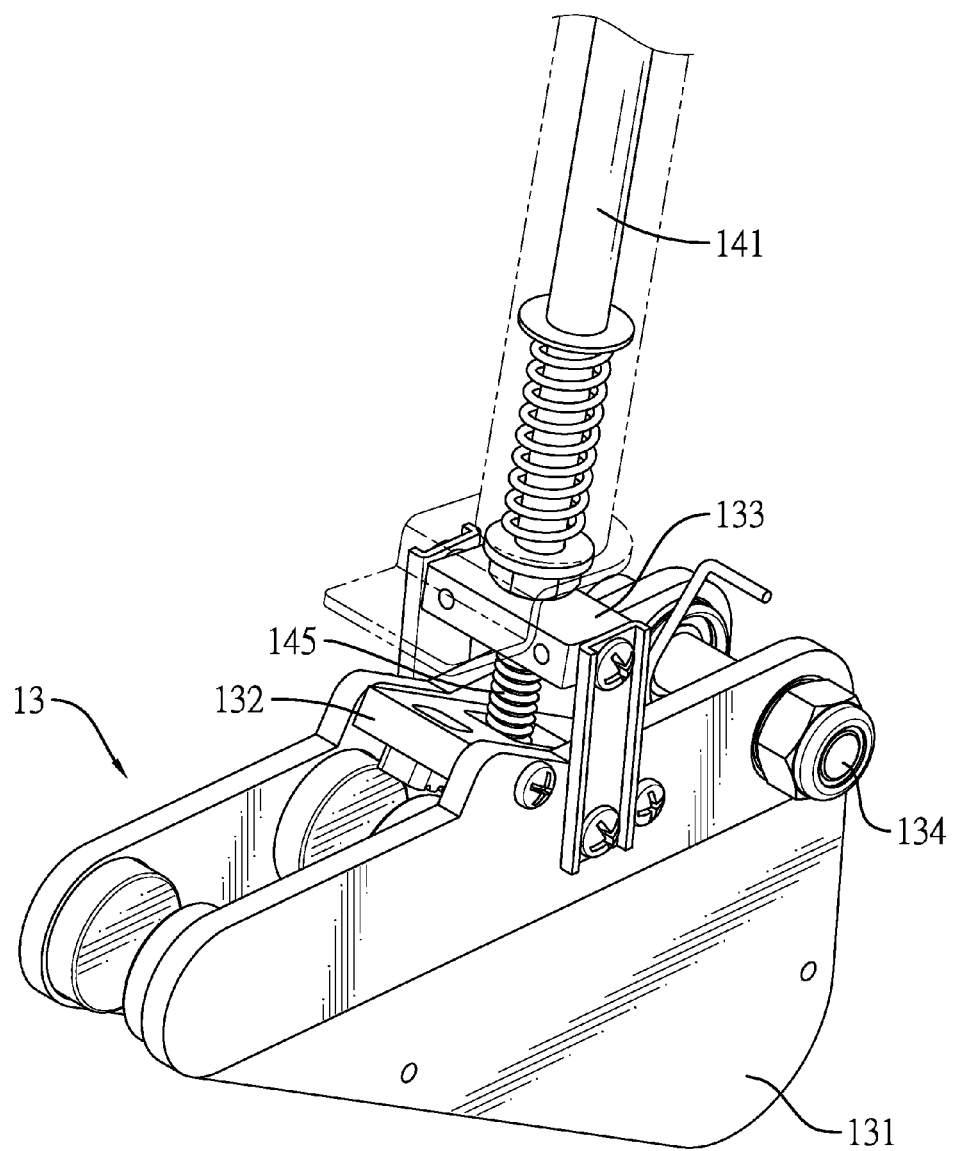
FIG. 3 is a partial perspective view of a torque driving apparatus and an adjusting assembly of the exercise bike of FIG. 1.

With reference to FIG. 2 and FIG. 3, the torque driving apparatus 13 comprises a body 131, a resisting member 132 mounted in the body 131, and a connecting member 133 mounted above the body 131. The body 131 has a portion that is pivotally connected to a fixed member 121 of the stationary base 12 by a pivot 134. The pivot 134 functions as a fulcrum, such that the torque driving apparatus 13 can be rotated relative to the fixed member 121 within a limited angle range. Also, the torque driving apparatus 13 is moveably mounted on the torque providing apparatus 11. The resisting member 132 can contact an edge of the torque providing apparatus 11 to exert friction as a resisting force on the torque providing apparatus 11. The connecting member 133 has a screw hole 135 beside the torque providing apparatus 11. The stationary base 12 can have a tube member 122. An adjusting assembly 14 is mounted through the tube member 122 and has a bar member 141 and a head 142. The bar member 141 has a ring groove 143. An end of a bolt 144 is inserted into the ring groove 143 of the bar member 141 through the tube member 122, such that the bar member 141 can spin relative to the tube member 122 at a fixed position. The head 142 is mounted on a top of the bar member 141. A thread segment 145 is formed on a bottom of the bar member 141 and is exposed out of the tube member 122. The screw hole 135 of the connecting member 133 of the torque driving apparatus 13 is moveably connected to the thread segment 145 of the bar member 141.

A user can handle the head 142 of the adjusting assembly 14 and rotate the adjusting assembly 14, such that the connecting member 133 of the torque driving apparatus 13 can move upward or downward relative to the thread segment 145 to rotate the torque driving apparatus 13 relatively to the fixed member 121. Hence, a contact area between the resisting member 132 of the torque driving apparatus 13 and the torque providing apparatus 11 is decreased or expanded to change the resisting force exerted on the torque providing apparatus 11. For example, with reference to FIG. 4, the torque driving apparatus 13 is rotated downward, such that the resisting member 132 is pressed on the torque providing apparatus 11 to expand the contact area between the resisting member 132 and the torque providing apparatus 11. Hence, torque generated by the torque providing apparatus 11 is increased. In conclusion, the setting torque of the torque providing apparatus 11 is directly proportional to the resisting force exerted on the torque providing apparatus 11 by the resisting member 132. When the setting torque of the torque providing apparatus 11 is higher, the user has to make greater effort to pedal on the exercise bike 100 to rotate the torque providing apparatus 11.

In another embodiment, the resisting member 132 of the torque driving apparatus 13 can be replaced with a magnetic assembly (not shown in the figures). The magnetic assembly can be mounted on the body 131 of the torque driving apparatus 13 and is not in contact with the torque providing apparatus 11 to provide a magnetic resisting force. For example, when the torque driving apparatus 13 is rotated downward, magnetic flux generated by the magnetic assembly is increased and the magnetic flux passes through the torque providing apparatus 11 to enhance the magnetic resisting force to increase the setting torque of the torque providing apparatus 11.

Figure 5:
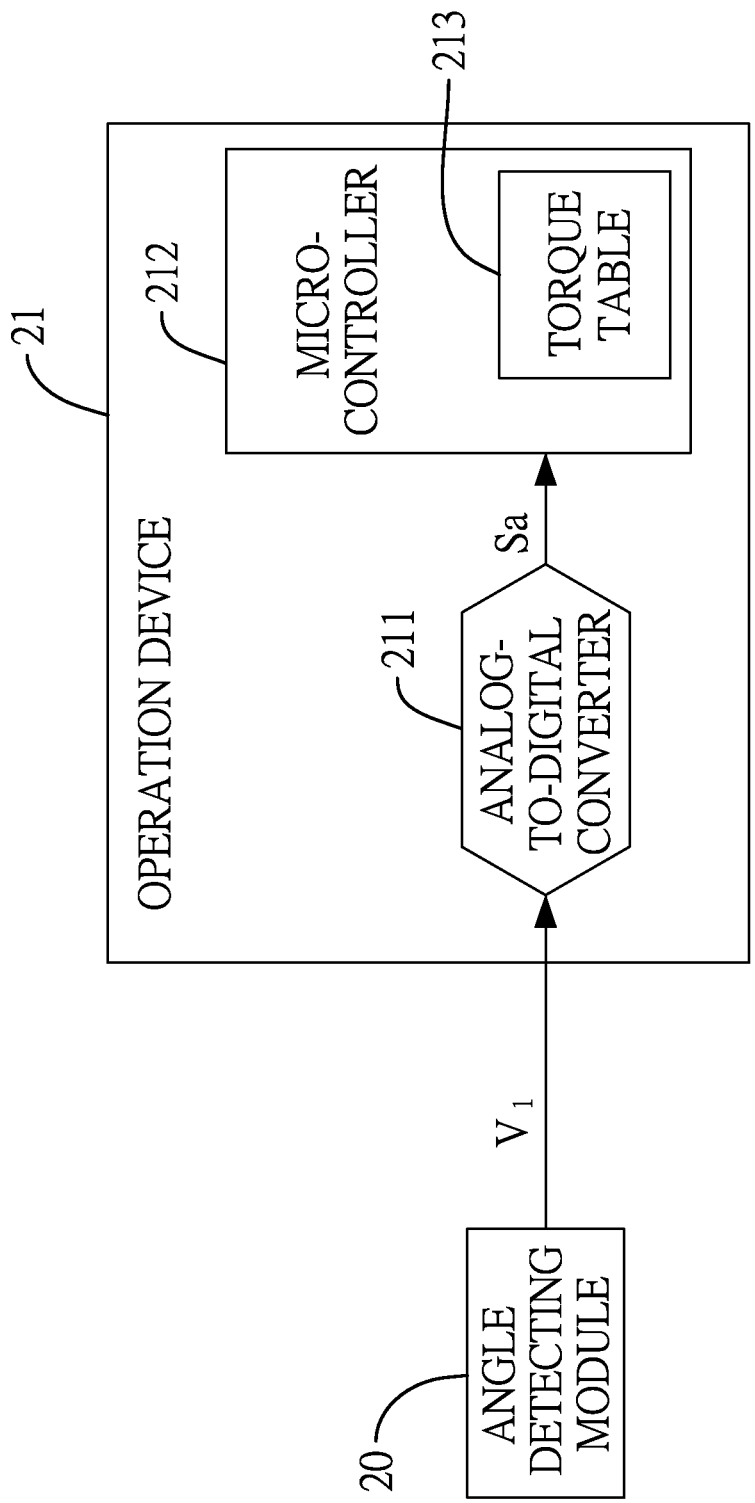
FIG. 5 is a circuit block diagram of a first embodiment of the torque detecting system of the present invention.

With reference to FIG. 1 and FIG. 5, the torque detecting system of the present invention comprises an angle detecting module 20 and an operation device 21. The angle detecting module 20 can be a gravity sensor. The angle detecting module 20 is mounted on the torque driving apparatus 13. The angle detecting module 20 generates a detecting voltage V1 according to a relative angle between a self-axis, such as X-axis, Y-axis, or Z-axis in three dimensional coordinates, and a reference axis, such as an axis of gravity. Said relative angle can be directly or inversely proportional to the detecting voltage V1. The detecting voltage V1 is an analog voltage.

Figure 4:
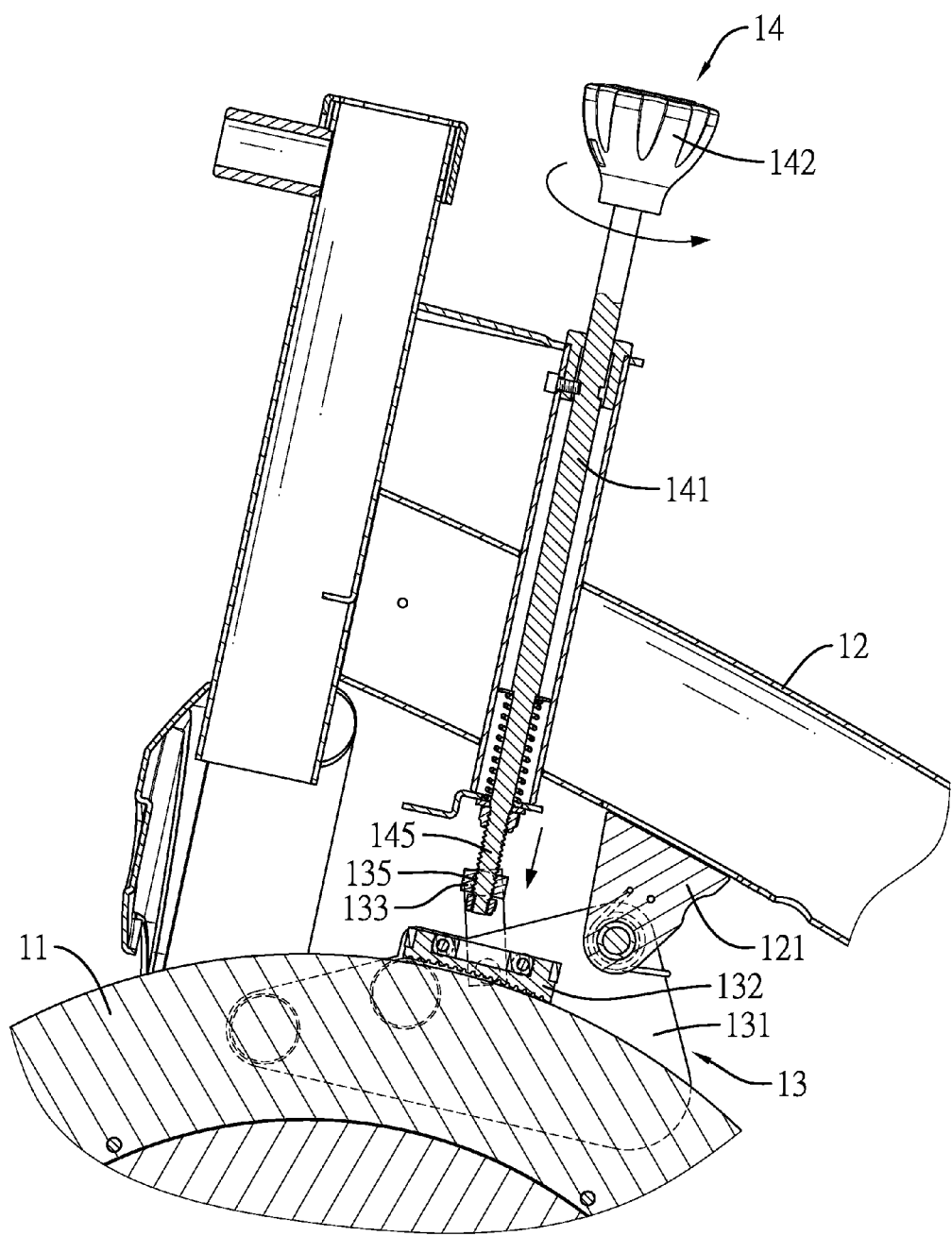
FIG. 4 is a partial cross-sectional view of the torque driving apparatus pressing on a torque providing apparatus.

With reference to FIG. 2, when the torque driving apparatus 13 is at an initial position, the resisting member 132 does not contact the torque providing apparatus 11, such that the torque providing apparatus 11 offers a minimum torque and the detecting voltage V1 generated by the angle detecting module 20 can be a minimum voltage. With reference to FIG. 4, when the torque driving apparatus 13 is rotated downward, the resisting member 132 contacts the torque providing apparatus 11 to gradually increase the setting torque of the torque providing apparatus 11. At that time, the angle detecting module 20 is moved with the rotated torque driving apparatus 13. Said relative angle is gradually increased, such that the detecting voltage V1 varies to be higher. In other words, the detecting voltage V1 of the angle detecting module 20 is related to the setting torque of the torque providing apparatus 11.

The operation device 21 is electrically connected to the angle detecting module 20 to receive the detecting voltage V1 and obtain a torque value via table-searching based on the detecting voltage V1. The torque value corresponds to the setting torque of the torque providing apparatus.

With reference to FIG. 5, a circuit block diagram of a first embodiment of the present invention is disclosed. The operation device 21 comprises an analog-to-digital converter 211 and a microcontroller 212. The analog-to-digital converter 211 is electrically connected to the angle detecting module 20 to receive the detecting voltage V1 and convert the detecting voltage V1 to a detecting value Sa. The microcontroller 212 is electrically connected to an output terminal of the analog-to-digital converter 211 to receive the detecting value Sa. The microcontroller 212 stores a torque table 213 including multiple detecting values and multiple torque values respectively corresponding to the multiple detecting values. Hence, the microcontroller 212 selects a torque value from the torque table 213 according to the detecting value Sa generated by the analog-to-digital converter 211. The torque value selected by the microcontroller 212 corresponds to the setting torque of the torque providing apparatus 11 at the moment. The establishment of the torque table 213 would be described in the following paragraph.

Figure 6:
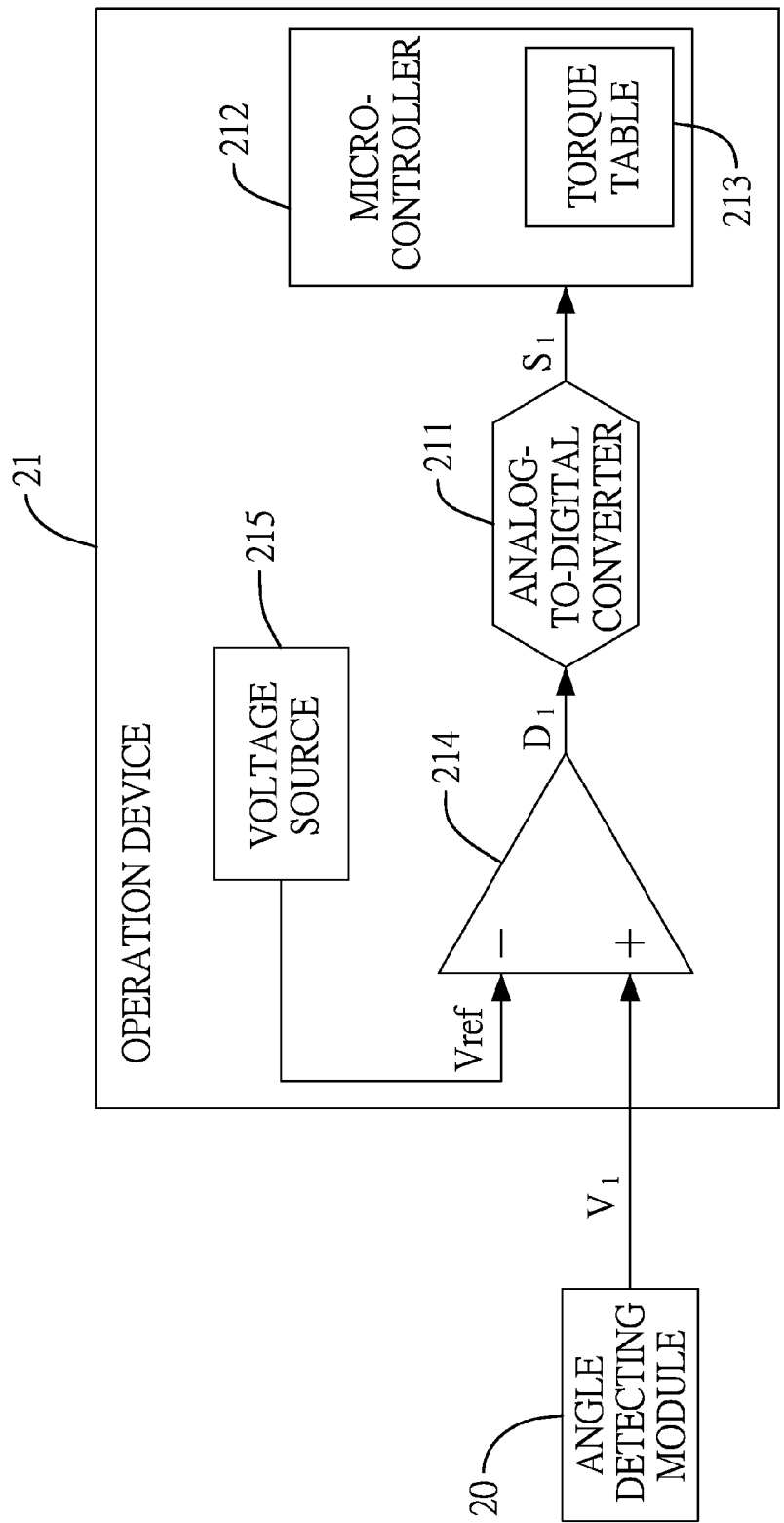
FIG. 6 is a circuit block diagram of a second embodiment of the torque detecting system of the present invention.

With reference to FIG. 6, a circuit block diagram of a second embodiment of the present invention is disclosed. Compared with the first embodiment, the operation device 21 further comprises a differential amplifier 214. The differential amplifier 214 comprises a first input terminal (−), a second input terminal (+), and an output terminal. The first input terminal (−) receives a reference signal Vref, wherein the reference signal Vref is constant. In the second embodiment, the first input terminal (−) can be electrically connected to a voltage source 215. The voltage source 215 outputs a constant direct current (DC) voltage as the reference signal Vref. The second input terminal (+) is electrically connected to the angle detecting module 20 to receive the detecting voltage V1. The differential amplifier 214 generates a differential signal D1 according to the detecting voltage V1 and the reference signal Vref. The output terminal of the differential amplifier 214 outputs the differential signal D1. An input terminal of the analog-to-digital converter 211 is electrically connected to the output terminal of the differential amplifier 214 to receive the differential signal D1. The analog-to-digital converter 211 converts the differential signal D1 to a differential value S1.

The microcontroller 212 in the second embodiment is electrically connected to the output terminal of the analog-to-digital converter 211 to receive the differential value S1. The microcontroller 212 selects a torque value from the torque table 213 according to the differential value S1 generated by the analog-to-digital converter 211. The torque value selected by the microcontroller 212 corresponds to the setting torque of the torque providing apparatus 11 at the moment. The establishment of the torque table 213 would be described in the following paragraph.

Figure 7:
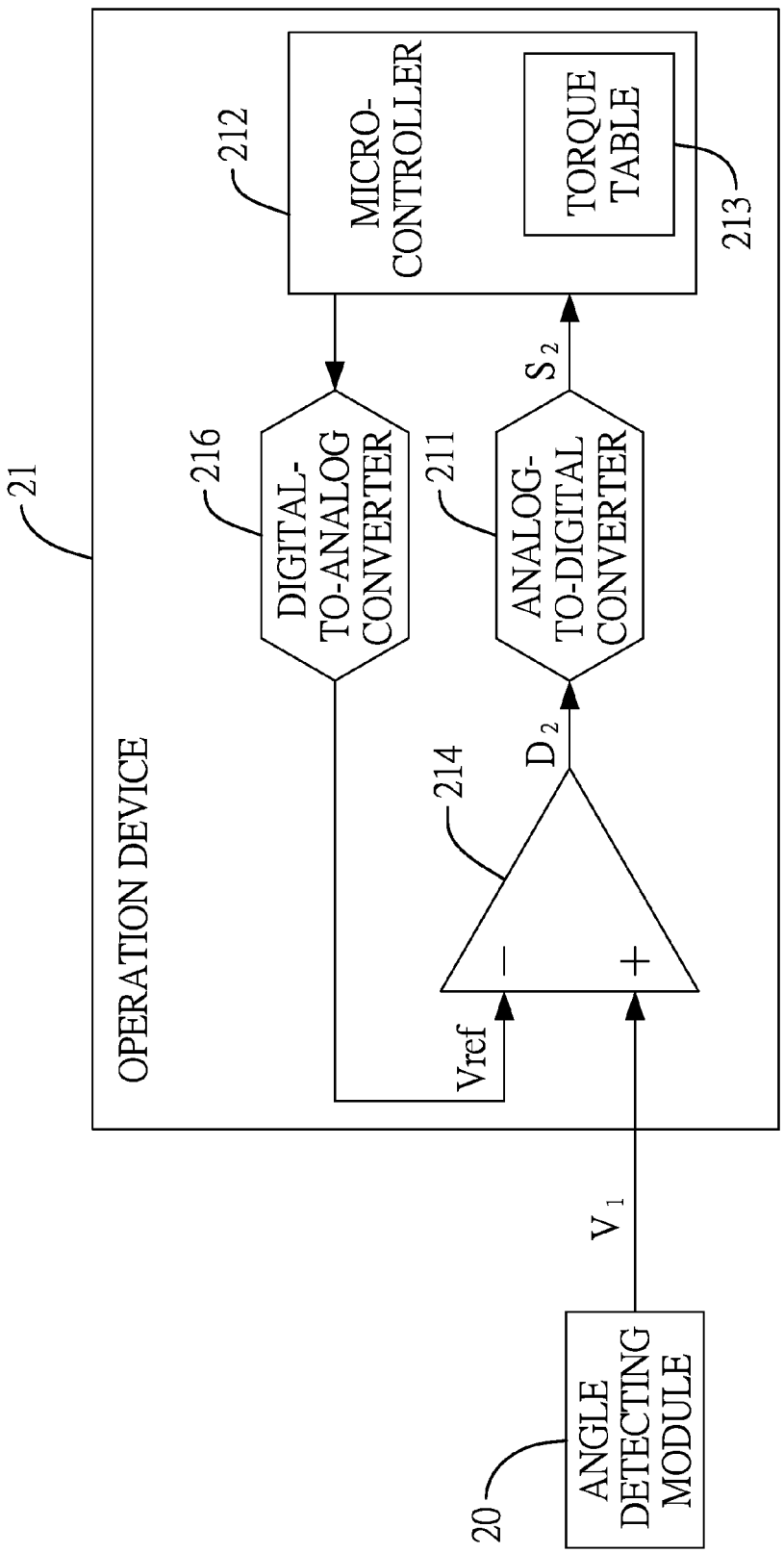
FIG. 7 is a circuit block diagram of a third embodiment of the torque detecting system of the present invention.

With reference to FIG. 7, a circuit block diagram of a third embodiment of the present invention is disclosed. The operation device 21 further comprises a digital-to-analog converter 216. An input terminal and an output terminal of the digital-to-analog converter 216 are electrically and respectively connected to an output terminal of the microcontroller 212 and the first input terminal (−) of the differential amplifier 214. The microcontroller 212 outputs the reference signal Vref to the differential amplifier 214 via the digital-to-analog converter 216. The differential amplifier 214 generates a differential signal D2 according to the detecting voltage V1 and the reference signal Vref and sends the differential signal D2 to the analog-to-digital converter 211. The analog-to-digital converter 211 converts the differential signal D2 to a differential value S2. The microcontroller 212 selects a torque value from the torque table 213 according to the differential value S2 generated by the analog-to-digital converter 211. The torque value selected by the microcontroller 212 corresponds to the setting torque of the torque providing apparatus 11 at the moment. The establishment of the torque table 213 would be described in the following paragraph.

Figure 8:
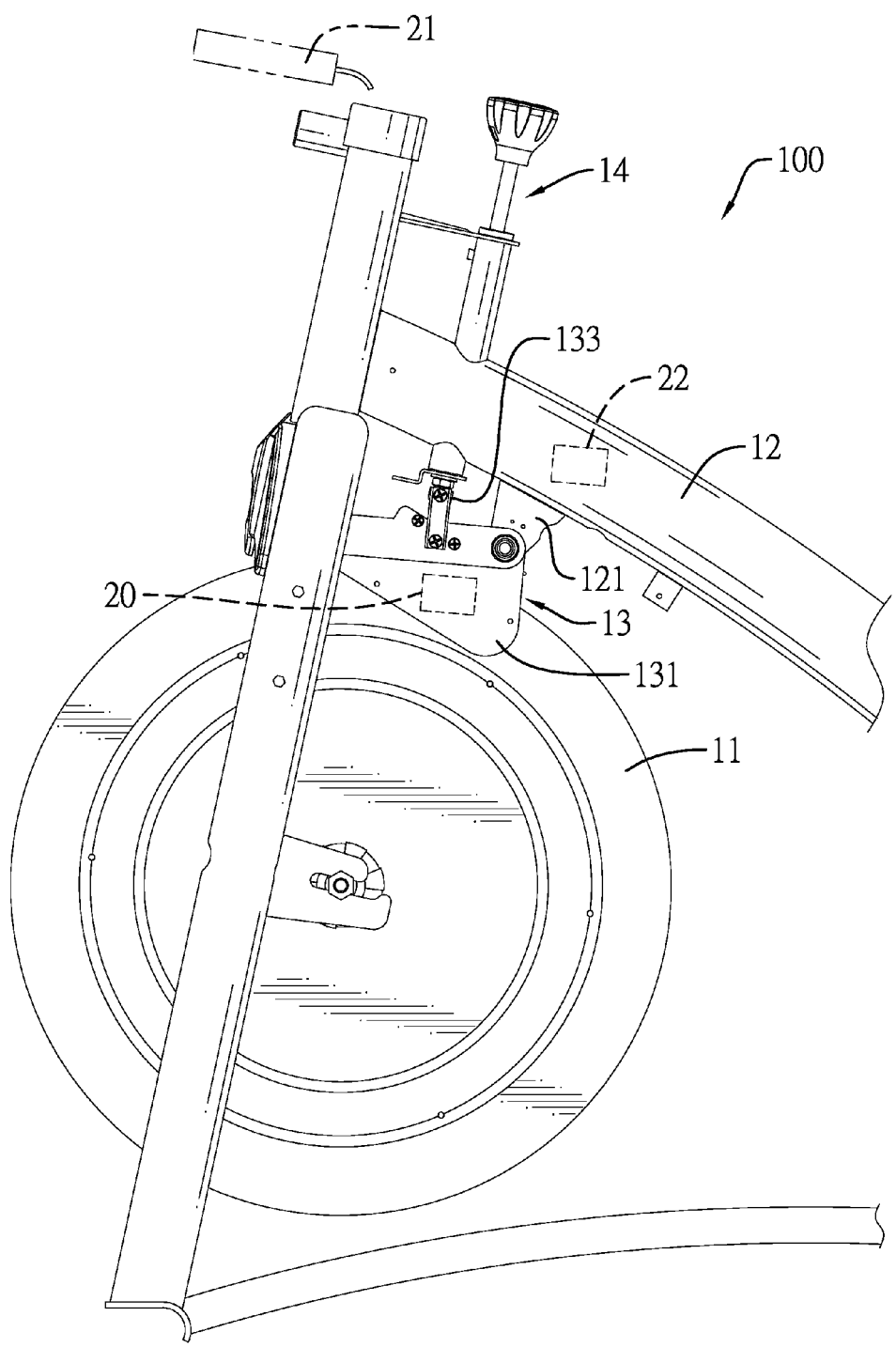
FIG. 8 is a schematic elevation view of a fourth embodiment of the torque detecting system mounted on the exercise bike.

With reference to FIG. 8, the torque detecting system of the present invention further comprises an auxiliary detecting module 22. The auxiliary detecting module 22 is mounted on the stationary base 12. The auxiliary detecting module 22 can be a gravity sensor as the angle detecting module 20. Because the stationary base 12 is settled on a ground, position of the stationary base 12 remains unchanged throughout the whole duration of the user's riding the exercise bike 100. Therefore, the auxiliary detecting module 22 can output a constant DC voltage.

Figure 9:
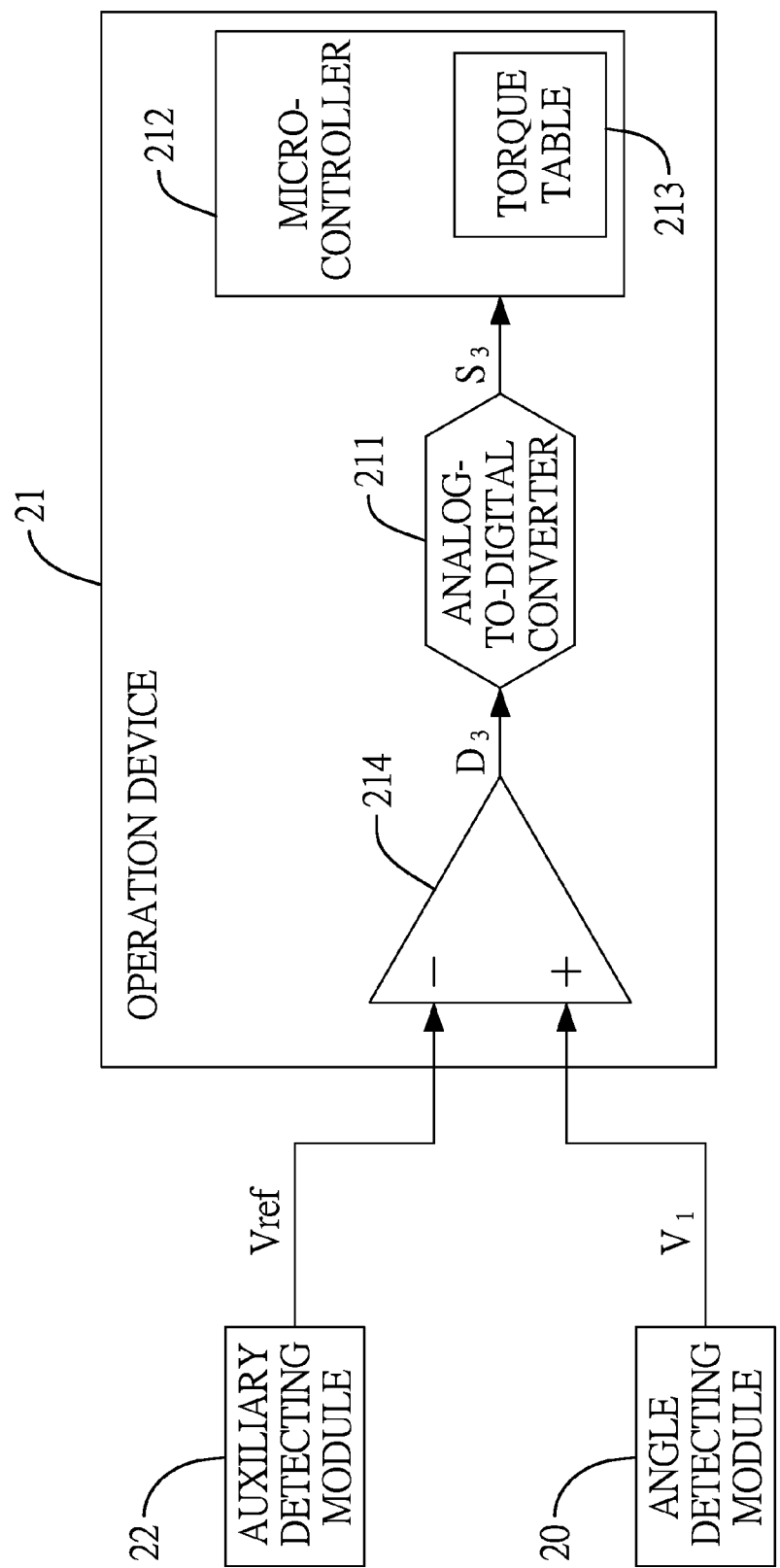
FIG. 9 is a circuit block diagram of the fourth embodiment of the torque detecting system of the present invention.

Based on the angle detecting module 20 and the auxiliary detecting module 22 as shown in FIG. 8, with further reference to FIG. 9, a circuit block diagram of a fourth embodiment of the present invention is disclosed. The angle detecting module 20 and the auxiliary detecting module 22 are configured toward a same direction. The operation device 21 comprises the differential amplifier 214, the analog-to-digital converter 211, and the microcontroller 212 as mentioned above. The first input terminal (−) of the differential amplifier 214 is electrically connected to the auxiliary detecting module 22. Because the stationary base 12 is fixed, the auxiliary detecting module 22 can output a constant DC voltage as the reference signal Vref, such that the first input terminal (−) of the differential amplifier 214 receives the reference signal Vref. The differential amplifier 214 generates a differential signal D3 according to the detecting voltage V1 and the reference signal Vref and sends the differential signal D3 to the analog-to-digital converter 211. The analog-to-digital converter 211 converts the differential signal D3 to a differential value S3. The microcontroller 212 selects a torque value from the torque table 213 according to the differential value S3 generated by the analog-to-digital converter 211. The torque value selected by the microcontroller 212 corresponds to the setting torque of the torque providing apparatus 11 at the moment. The establishment of the torque table 213 would be described in the following paragraph.

Figure 10:
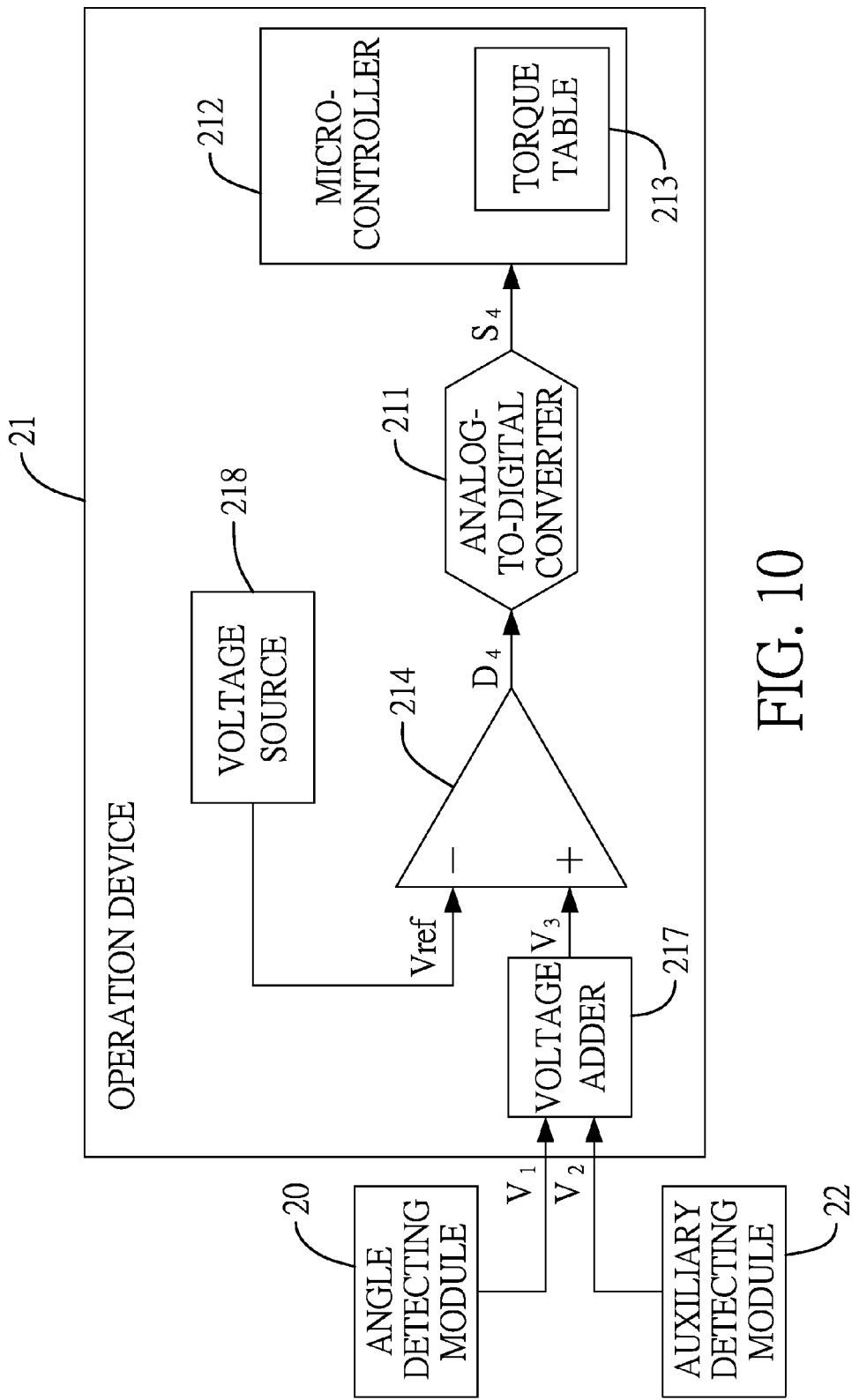
FIG. 10 is a circuit block diagram of a fifth embodiment of the torque detecting system of the present invention.

Based on the angle detecting module 20 and the auxiliary detecting module 22 as shown in FIG. 8, with further reference to FIG. 10, a circuit block diagram of a fifth embodiment of the present invention is disclosed. The angle detecting module 20 and the auxiliary detecting module 22 are configured toward opposite directions. The operation device 21 comprises the differential amplifier 214, the analog-to-digital converter 211, and the microcontroller 212 as mentioned above. In the fifth embodiment, the operation device 21 further comprises a voltage adder 217. The voltage adder 217 has two input terminals respectively and electrically connected to the angle detecting module 20 and the auxiliary detecting module 22. The first input terminal (−) of the differential amplifier 214 can be electrically connected to a voltage source 218 to receive the reference signal Vref. The second input terminal (+) of the differential amplifier 214 is electrically connected to an output terminal of the voltage adder 217.

In the fifth embodiment, the voltage adder 217 adds the detecting voltage V1 of the angle detecting module 20 to an output voltage V2 of the auxiliary detecting module 22 to obtain a sum voltage V3. The differential amplifier 214 generates a differential signal D4 according to the sum voltage V3 and the reference signal Vref and sends the differential signal D4 to the analog-to-digital converter 211. The analog-to-digital converter 211 converts the differential signal D4 to a differential value S4. The microcontroller 212 selects a torque value from the torque table 213 according to the differential value S4 generated by the analog-to-digital converter 211. The torque value selected by the microcontroller 212 corresponds to the setting torque of the torque providing apparatus 11 at the moment. The establishment of the torque table 213 would be described in the following paragraph.

Regarding the establishment of the torque table 213 in the first to fifth embodiments, during manufacture of the exercise bike 100 with the torque detecting system of the present invention, a manufacturer can rotate the adjusting assembly 14 to change the setting torque of the torque providing apparatus 11 step-by-step, record the detecting value Sa (or the differential values S1-S4) on each step, and measure actual torques of the torque providing apparatus 11 by using a torque sensor on each step. After the testing as mentioned above, the manufacturer obtains multiple detecting values Sa (or differential values S1-S4) and multiple torque values. Afterwards, the manufacturer can operate a computer and programmer device to write the detecting values Sa (or differential values S1-S4) and the torque values into the microcontroller 212 to establish the torque table 213. The table below is an example of the torque table 213. In general, the relationship of the detecting values Sa (or differential values S1-S4) and the torque values is linear.

| Detecting values Sa (or differential values S1-S4) | Torque value |
| --- | --- |
| 1 | 5 |
| 2 | 10 |
| 3 | 15 |
| 4 | 20 |

When the exercise bike 100 is for merchandise, the microcontroller 212 already has the torque table 213. When a user rides on the exercise bike 100, the user can rotate the adjusting assembly 14 to change the setting torque of the torque providing apparatus 11 in consideration of body condition and desired exercising strength. After the torque adjustment, based on the torque table 213, when the detecting value Sa (or the differential value S1-S4) received by the microcontroller 212 from the analog-to-digital converter 211 is 2, a corresponding torque value is 10. An objective to detect the setting torque is accomplished. The microcontroller 212 can display the torque value via a display device, such that the user can watch the display device to know the present torque value.

Regarding the second embodiment to the fifth embodiment, the differential amplifier 214 can reduce interference of noises and improve assembling tolerance of the angle detecting module 20 and the auxiliary detecting module 22. In addition, even the manufacturing condition of the exercise bike 100 differs from the condition of use, for example, the exercise bike 100 is put on a horizontal plane during manufacturing but is put on an inclined plane for use, for the first embodiment to the third embodiment, the reference voltage Vref can be corrected to eliminate the error induced by the different conditions.

Regarding the fourth embodiment, the differential signal D3 generated by the differential amplifier 214 is a relative signal between the detecting voltage V1 and the reference signal Vref. When the exercise bike 100 is put on an inclined plane, the angle detecting module 20 and the auxiliary detecting module 22 are synchronously inclined. Because the angle detecting module 20 and the auxiliary detecting module 22 are configured toward the same direction, variations of the detecting voltage V1 and the reference signal Vref are same, such that the differential signal D3 would not be affected. The error resulting from inclined positioning of the exercise bike 100 would be eliminated.

Regarding the fifth embodiment, when the exercise bike 100 is put on an inclined plane, the angle detecting module 20 and the auxiliary detecting module 22 are synchronously inclined. However, the angle detecting module 20 and the auxiliary detecting module 22 are configured toward opposite directions. Due to the inclined condition, the detecting voltage V1 of the angle detecting module 20 comprises a positive variation, and the output voltage V2 of the auxiliary detecting module 22 comprises a negative variation. A summation of the positive variation of the detecting voltage V1 and the negative variation of the output voltage V2 would be zero, such that the sum voltage V3 generated by the voltage adder 217 can eliminate the error induced by the inclined condition.

What is claimed is:

1. A torque detecting system adapted to detect a setting torque of a torque providing apparatus driven by a torque driving apparatus mounted on a stationary base, wherein the torque driving apparatus exerts a resisting force on the torque providing apparatus and the setting torque of the torque providing apparatus corresponds to the resisting force, the torque detecting system comprising:
    an angle detecting module mounted on the torque driving apparatus and outputting a detecting voltage that is varied with a movement of the torque driving apparatus relative to the stationary base; and
    an operation device electrically connected to the angle detecting module to receive the detecting voltage and obtain a torque value via table-searching based on the detecting voltage, wherein the torque value corresponds to the setting torque of the torque providing apparatus;
    wherein the operation device comprises
    a voltage adder having two input terminals respectively and electrically connected to the angle detecting module and an auxiliary detecting module, wherein the angle detecting module and the auxiliary detecting module are configured toward opposite directions;
    a differential amplifier having
    a first input terminal receiving a reference signal;
    a second input terminal electrically connected to an output terminal of the voltage adder; and
    an output terminal generating a differential signal;
    an analog-to-digital converter electrically connected to the output terminal of the differential amplifier to convert the differential signal to a differential value; and
    a microcontroller electrically connected to the analog-to-digital converter and storing a torque table to select the torque value from the torque table according to the differential value generated by the analog-to-digital converter.

2. The torque detecting system as claimed in claim 1, wherein
    the first input terminal of the differential amplifier is electrically connected to a voltage source; and
    the voltage source outputs a constant DC voltage as the reference signal.

3. The torque detecting system as claimed in claim 1, wherein the angle detecting module is a gravity sensor.

4. The torque detecting system as claimed in claim 2, wherein the angle detecting module is a gravity sensor.

5. The torque detecting system as claimed in claim 1, wherein the auxiliary detecting module is a gravity sensor.

6. The torque detecting system as claimed in claim 2, wherein the auxiliary detecting module is a gravity sensor.

\* \* \* \* \*